UNITED STATES PATENT OFFICE.

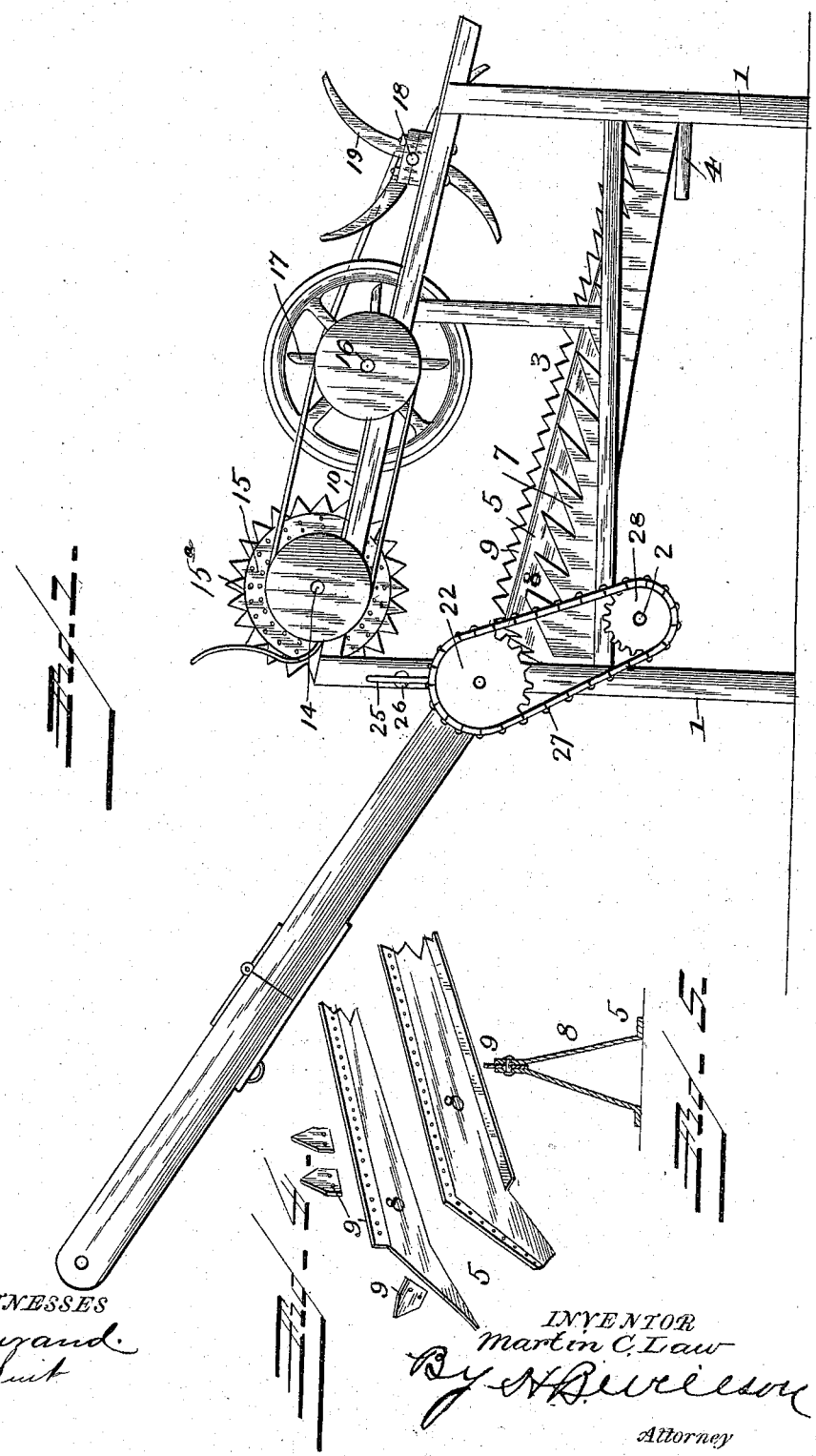

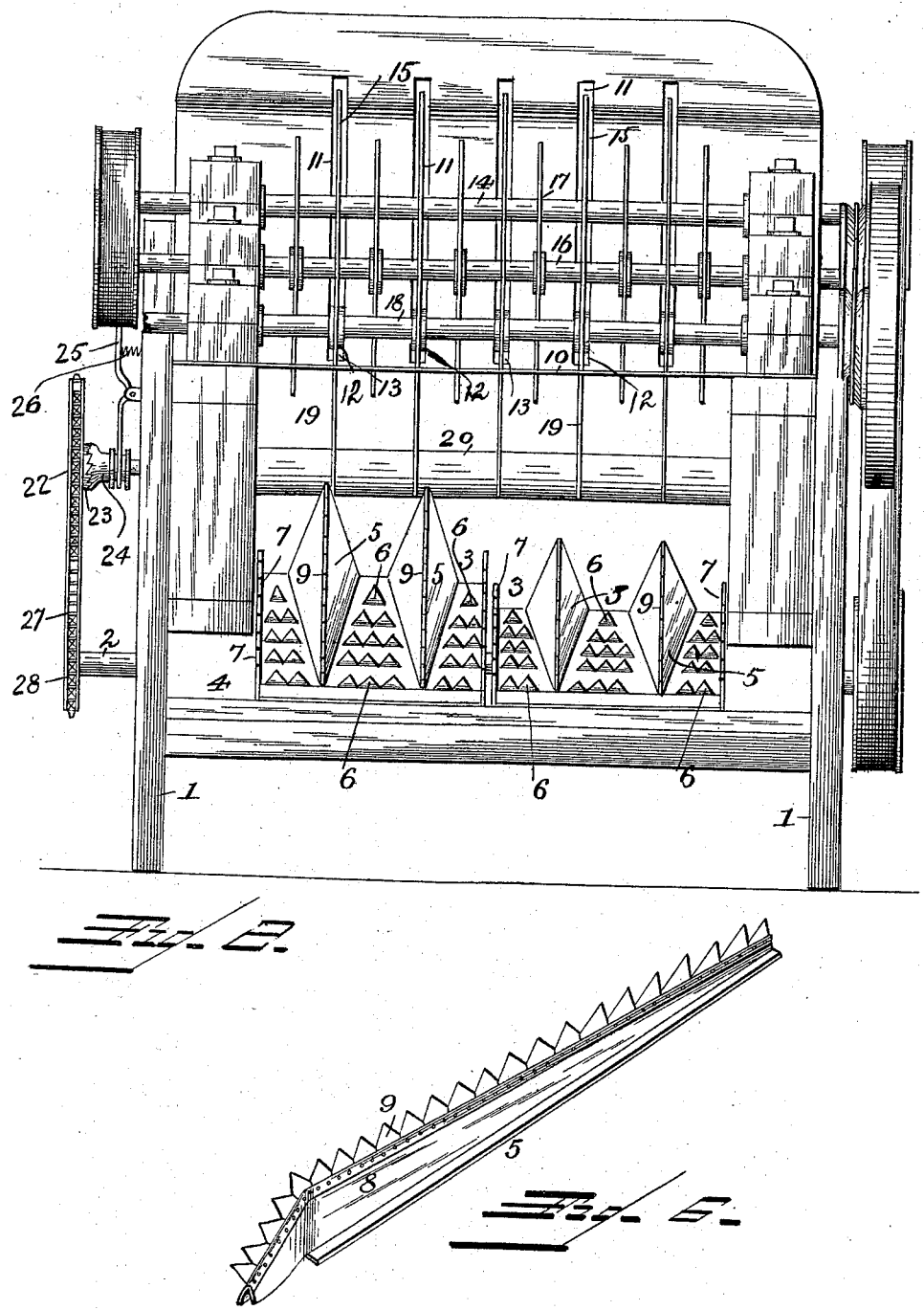

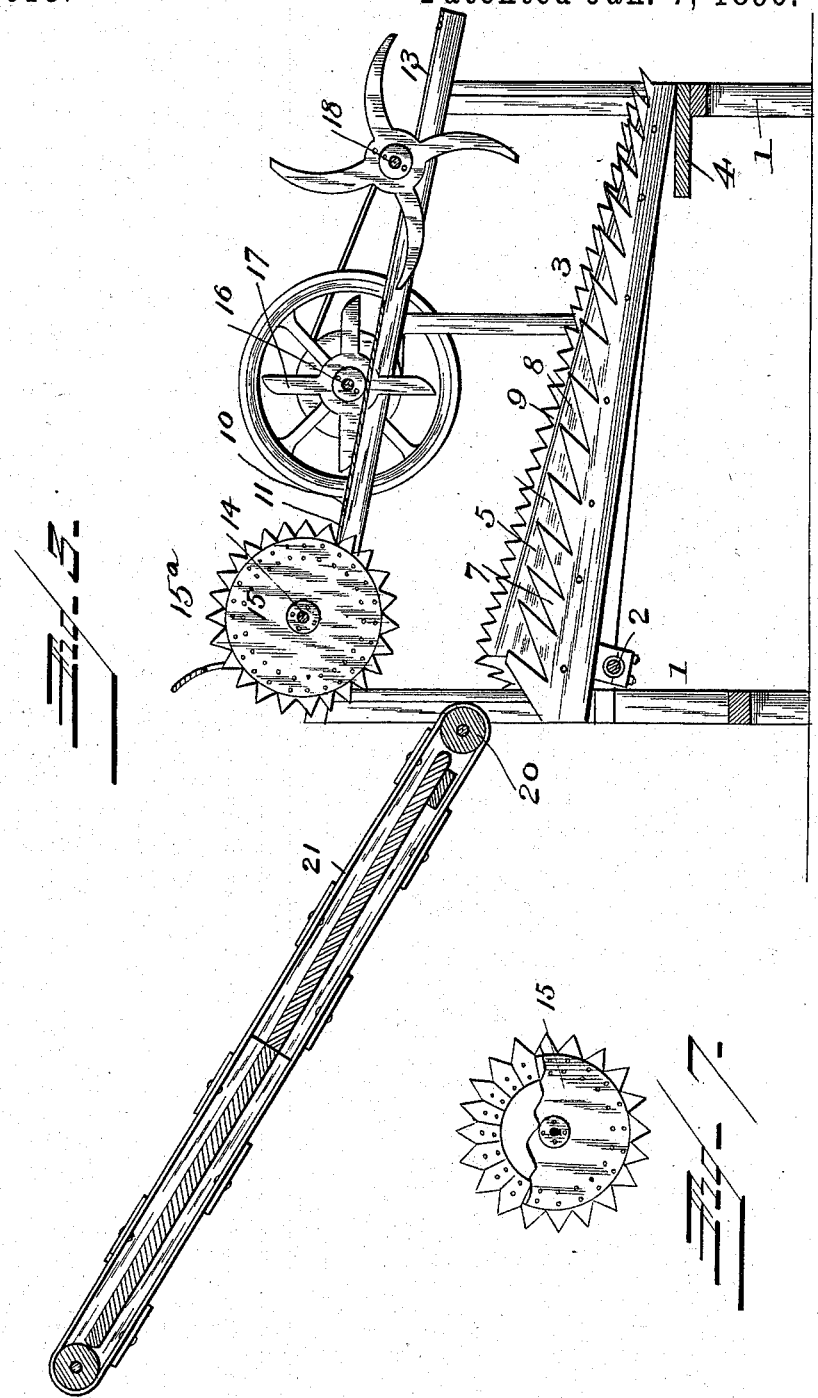

MARTIN C. LAW, OF KLEMME, IOWA.

COMBINED FEEDER AND BAND-CUTTER.

SPECIFICATION forming part of Letters Patent No. 552,615, dated January 7, 1896.

Application filed July 22, 1895. Serial No. 556,739. (No model.)

*To all whom it may concern:*

Be it known that I, MARTIN C. LAW, a citizen of the United States, residing at Klemme, in the county of Hancock and State of Iowa, have invented certain new and useful Improvements in a Combined Feeder and Band-Cutter for Thrashing-Machines; and I do declare the following to be a full, clear, and exact description of the invention, such as will enable others skilled in the art to which it appertains to make and use the same.

My invention relates to feeders and band-cutters for thrashing-machines.

The object of the invention is to provide a band-cutter which will cut the bands of the sheaves with certainty, spread the sheaves and feed them to the thrashing-cylinder, and to improve the construction of the machine, so as to render it strong, durable and effective.

With these objects in view the invention consists in certain features of construction and combination of parts, which will be hereinafter fully described and claimed.

In the drawings, Figure 1 is a side view of my improved band-cutter and feeder. Fig. 2 is an end view of the same. Fig. 3 is a longitudinal vertical sectional view. Fig. 4 is a detail perspective view of one of the feeding-ribs, showing the parts of which it is composed separated. Fig. 5 is a vertical sectional view of the rib. Fig. 6 is a perspective view of the same.

In the drawings, 1 denotes the frame of the machine which may be of any usual or approved construction. To the front end of this frame the main crank-shaft 2 is journaled and is adapted to be driven by any movable part of the thrashing-machine.

3 denotes the feeding-tables, the forward ends of which are journaled upon the crank portions of the shaft, as shown, and the rear ends of which rest and reciprocate upon a cross-bar 4 at the rear of the machine and in close proximity to the thrashing-cylinder. In the present instance I have shown two tables; but it is evident that more or less may be employed, as the case may require. Each of these tables has upon its upper face a series of inclined toothed ribs 5 and a series of angular tongues 6 located between these ribs, and toothed flanges 7 secured to the sides of each table. The ribs above referred to each consist of the side strips 8, between the upper edges of which are secured the teeth 9. The forward edge of the rib is bent or is inclined downward and forms a band-cutter. The teeth near the ends of the ribs are provided with vertical rear edges and inclined forward edges, whereby they will more effectively grasp and feed the grain toward the cylinder.

10 denotes a plate secured to the top of the frame and provided with three rows of alternating slits 11, 12 and 13, respectively.

14 denotes a shaft journaled above the slits 11 and provided with circular band-cutters 15, which are composed of sickle-sections $15^a$, riveted between the plates $15^b$, so that should one or more sections become worn or damaged it may be moved and replaced with another. Journaled above the slits 12 is another shaft 16, to which is secured a series of combined band-cutters and spreaders 17. 18 denotes the third shaft, which is journaled above the slits 13 and is provided with a series of leaders 19, it being understood that the leaders, spreaders and band-cutters mounted upon these shafts work through their respective slits. These shafts are provided with sprocket wheels or pulleys, and motion is transmitted from the main or crank shaft by belts or chains in the usual manner, further description of which will not be necessary.

20 denotes a roller journaled in the front end of the main frame, which supports an elevator-frame carrying an endless apron 21 of the usual and well-known construction. I loosely mount upon one end of the shaft, upon which the roller is supported, a sprocket-wheel 22, which has upon its face a clutch-section 23. Splined upon the shaft of the roller adjacent to this clutch-section is a clutch member 24. A lever 25 is pivoted to the frame and has its lower forked end engaging this clutch member, and a spring 26 exerts its energy to hold the clutch member in the clutch-section of the sprocket-wheel. The sprocket-wheel is connected by a sprocket-chain 27 to a sprocket-wheel 28 on the ends of the drive-shaft, thereby giving motion to the endless apron.

A cord or rope may be secured to the lever 25 and extends to the rear end of the thrashing-machine within convenient reach of the attendant, so that should any part of the thrasher or feeder get out of order by simply drawing upon the cord the clutch will be thrown out of gear with the sprocket-wheel and further movement of the endless apron stopped. The front of the plate 10, if desired, may be bent upward, so that the sheaves of wheat, as they are fed to the forward rotary cutters, will be held until they are grasped by the said cutters and their bands severed.

In operation the sheaves are fed by means of the endless apron to the forward rotary band-cutters 15, which cut the bands, and the ribs of the table will engage the stalks of wheat and by their movement will move them tooth by tooth to the rear end of the machine, the lips projecting from the bottom of the table assisting in this movement of the stalks. The stalks, on their passage along the tables, are engaged by the spreaders 17, which separate or spread them from the tables, and when they reach the rear end of the machine the leaders 19 assist the ribs in feeding the thrashing-cylinder. It will thus be seen that should the band-cutters fail to sever the bands the forward inclined ends of the ribs or the spreaders 17 will do so. Thus it will be absolutely impossible for a sheaf of wheat to get to the thrashing-cylinder without its band being severed.

From the foregoing description, taken in connection with the accompanying drawings, the operation of the invention will be readily understood. The machine is comparatively simple of construction and performs its work in a very efficient manner.

Although I have shown and described the preferred form of my machine it is evident that slight changes in its constructian may be resorted to without materially changing its operation or departing from the spirit of my invention. I therefore reserve to myself the right to make such changes as may be suggested to an ordinary mechanic.

Having thus described my invention, I claim and desire to secure by Letters Patent of the United States—

1. The combination with a main frame, a crank shaft journaled therein, tables having their forward ends journaled to the cranks of the crank-shaft, and the toothed ribs for said table, each of said ribs consisting of side pieces and a toothed strip, the strip being secured between the upper edges of the side pieces, the forward end of the toothed strip and side pieces being bent downwardly, substantially as set forth.

2. A toothed rib for the table of a band cutter and feeder, said toothed rib consisting of side pieces and a toothed strip, the strip being secured between the upper edges of the side pieces and the forward ends of the toothed strip and side pieces being bent downwardly, substantially as set forth.

In testimony whereof I affix my signature in presence of two witnesses.

MARTIN C. LAW.

Witnesses:
 HENRY J. STROMER,
 FRED HENSCHEN.